US008725114B2

(12) United States Patent
Syal et al.

(10) Patent No.: US 8,725,114 B2
(45) Date of Patent: May 13, 2014

(54) METHOD AND APPARATUS FOR TRANSFERRING IDENTITY INFORMATION TO A WIRELESS DEVICE

(75) Inventors: Ashish Syal, Vancouver (CA); Steven John Bennett, Coquitlam (CA); Gustav Gerald Vos, Surrey (CA)

(73) Assignee: NETGEAR, Inc., San Jose, CA (US)

( * ) Notice: Subject to any disclaimer, the term of this patent is extended or adjusted under 35 U.S.C. 154(b) by 0 days.

(21) Appl. No.: 13/619,764

(22) Filed: Sep. 14, 2012

(65) Prior Publication Data
US 2013/0252576 A1 Sep. 26, 2013

Related U.S. Application Data

(63) Continuation-in-part of application No. 12/854,093, filed on Aug. 10, 2010, now Pat. No. 8,306,505.

(51) Int. Cl.
H04W 88/02 (2009.01)
(52) U.S. Cl.
USPC .......................................................... 455/411
(58) Field of Classification Search
USPC .................. 455/411, 433–4, 435.2, 445, 558; 370/338, 352
See application file for complete search history.

(56) References Cited

U.S. PATENT DOCUMENTS

| 5,956,636 | A | 9/1999 | Lipsit |
| 6,052,600 | A | 4/2000 | Fette |
| 6,393,408 | B1 | 5/2002 | Mosher |
| 6,622,017 | B1 | 9/2003 | Hoffman |
| 6,628,934 | B2 | 9/2003 | Rosenberg |
| 6,636,489 | B1 | 10/2003 | Fingerhut |
| 6,785,556 | B2 | 8/2004 | Souissi |
| 6,792,271 | B1 | 9/2004 | Sherman |
| 6,871,063 | B1 | 3/2005 | Schiffer |
| 6,934,544 | B2 | 8/2005 | Cooper |
| 6,961,567 | B1 | 11/2005 | Kuhn |
| 6,985,931 | B2 | 1/2006 | Dowling |

(Continued)

FOREIGN PATENT DOCUMENTS

| EP | 1 703 760 A2 | 9/2006 |
| EP | 2 139 180 A1 | 12/2009 |

(Continued)

OTHER PUBLICATIONS

Office Action mailed Mar. 6, 2012, from U.S. Appl. No. 12/498,022, filed Jul. 6, 2009, 14 pages.

(Continued)

Primary Examiner — Diane Mizrahi
(74) Attorney, Agent, or Firm — Boyle Fredrickson, S.C.

(57) ABSTRACT

A method and apparatus for transferring identity information for temporary use by a wireless device, visiting a foreign operator network, is provided. A user is presented, at a kiosk, with an opportunity to download a temporary identity which is recognized by the operator network as belonging to a local subscriber, and the user may make a request for service. In response to the user-generated request for service, local identity information is transferred to the wireless device for use thereby. The transfer is short-range wireless communication from the kiosk to the wireless device. The temporary identity, once installed on the wireless device, makes the wireless device appear as a local subscriber. Upon termination of use, the temporary identity is returned to a pool and usable for another wireless device.

20 Claims, 7 Drawing Sheets

(56) References Cited

U.S. PATENT DOCUMENTS

| | | |
|---|---|---|
| 6,996,537 B2 | 2/2006 | Minear |
| 7,035,595 B1 | 4/2006 | Kim |
| 7,106,816 B2 | 9/2006 | Filipovic |
| 7,113,766 B2 | 9/2006 | Horel |
| 7,319,870 B2 | 1/2008 | Olson |
| 7,324,816 B2 | 1/2008 | Sherman |
| 7,363,056 B2 | 4/2008 | Faisy |
| 7,917,133 B2 | 3/2011 | Payne |
| 2002/0081992 A1 | 6/2002 | Keller |
| 2002/0156729 A1* | 10/2002 | Nilson .................. 705/40 |
| 2002/0197991 A1 | 12/2002 | Anvekar |
| 2003/0064723 A1 | 4/2003 | Thakker |
| 2003/0163350 A1 | 8/2003 | Rudowski |
| 2004/0210450 A1 | 10/2004 | Atencio |
| 2005/0101323 A1 | 5/2005 | De Beer |
| 2006/0063534 A1 | 3/2006 | Kokkonen |
| 2006/0291483 A1 | 12/2006 | Sela |
| 2007/0078924 A1 | 4/2007 | Hassan |
| 2007/0129078 A1 | 6/2007 | De Beer |
| 2007/0255662 A1* | 11/2007 | Tumminaro .............. 705/79 |
| 2008/0020760 A1 | 1/2008 | Elkarat |
| 2008/0081611 A1 | 4/2008 | Hoyt |
| 2008/0182622 A1 | 7/2008 | Makarowski |
| 2008/0188218 A1 | 8/2008 | Sherman |
| 2009/0154675 A1 | 6/2009 | Hanson |
| 2009/0158148 A1 | 6/2009 | Vellanki |
| 2009/0163175 A1 | 6/2009 | Shi |
| 2011/0004549 A1 | 1/2011 | Gray |
| 2011/0136492 A1* | 6/2011 | Bailey et al. .................. 455/445 |
| 2012/0039323 A1 | 2/2012 | Hirano |
| 2012/0225639 A1* | 9/2012 | Gazdzinski et al. .......... 455/410 |

FOREIGN PATENT DOCUMENTS

| | | |
|---|---|---|
| EP | 2 161 963 A1 | 3/2010 |
| WO | 02/13554 A1 | 2/2002 |
| WO | 2005/043826 A1 | 5/2005 |
| WO | 2009/053918 A2 | 4/2009 |

OTHER PUBLICATIONS

Office Action mailed Mar. 9, 2012, from U.S. Appl. No. 12/854,093, filed Aug. 10, 2010, which is the parent of the present application, 16 pages.

"Smart Cards; UICC Application Programming Interface and Loader Requirements; Service Description; (Release 6)," Technical Specification ETSI TS 102 240 (V6.0.0), European Telecommunications Standards Institute, Sophia Antipolis, France, Jul. 2002, 18 pages.

* cited by examiner

METHOD AND APPARATUS FOR TRANSFERRING IDENTITY INFORMATION TO A WIRELESS DEVICE

CROSS-REFERENCE TO A RELATED APPLICATION

This application is a continuation-in-part of application Ser. No. 12/854,093, filed Aug. 10, 2010, the entire disclosure of which is incorporated herein by reference.

TECHNICAL FIELD

The present subject matter pertains in general to wireless communications and in particular to a method and apparatus for transferring identity information, for example of the kind stored on a universal integrated circuit card (UICC), to a wireless device for temporary, permanent, or quasi-permanent use.

BACKGROUND

Wireless networks in general, and cellular networks, such as GSM, UMTS, CDMA and other networks, in particular, typically require wireless devices, such as mobile phones, PDAs or other cellular devices, to present identity information before granting access to the network. This identity information is used, for example, for billing purposes, for routing communication to the wireless device, identifying the wireless device within a network, and the like. Identity information may be associated with an identity module, such as a subscriber identity module (SIM), CDMA SIM (CSIM), Universal SIM (USIM), or the like. For example, identity information may include an international mobile subscriber identity (IMSI) number, as stored in a SIM and used to identify a subscriber to GSM and UMTS networks.

Identity information may be stored on a removable or non-removable storage medium or smart card, such as a universal integrated circuit card (UICC). A UICC may hold multiple applications, corresponding to different identity modules. Thus, the same UICC can potentially be used with different networks operating in accordance with different standards. The UICC smart card typically consists of a CPU, ROM, RAM, EEPROM and I/O circuits, and is configured to run one or more applications such as identity module applications.

Mobile devices are typically associated with a home network via the identity information stored thereon, but are often required to connect to other networks, for example while travelling or roaming. Current billing arrangements and roaming agreements can make it expensive to use communication networks other than a home network. For example a user may subscribe to a service that allows the communication of tens of Megabytes of data for an acceptable monthly fee, but may be charged a much higher fee per Megabyte when roaming in other countries or service areas. This expense can discourage the use of communications services when roaming Those who are unaware of the expense of service are frequently surprised when they receive an expensive bill and this leads to disputes with the service providers.

One of the reasons for such high costs is an ongoing lack of trust between service providers with respect to billing. In some cases visitors to a foreign location may have their data traffic sent via an expensive dedicated leased connection back to their home service provider so that billing can be performed by their home service provider. This may ensure accuracy of invoicing but does not serve the user in terms of reasonable price for the service. The limitations of the link also introduce delay and may limit the speed of the connection.

Some technically knowledgeable users who travel frequently may obtain a wireless device that can accept the UICC card of any service provider. This can be achieved by purchasing a device that has been unlocked, or by paying a fee to get a code from their home service provider to enable unlocking. Buying an unlocked device is more expensive to the user at the outset than buying a device that is locked and subsidized by their home network operator. In an unlocked device, the user may remove a UICC card configured for use with their home network, and install a UICC card purchased from another, more local provider in order to take advantage of lower rates. This is an inconvenience in that the removal and exchanging of the card can require the device to be opened up and the battery removed before access to the card can be achieved. It is also inconvenient where the device has voice capability, as the card defines the telephone number of the device because the number changes when the card is changed.

Therefore, there is a need for a solution that overcomes at least one of the deficiencies in the art.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One aspect of the present subject matter includes a method form for transferring identity information to a wireless device for use. The method is configured to enabling a wireless device for local operation with a foreign operator network. The method is implemented using one or more computing devices and comprises receiving a user-generated request for local operation of the wireless device at a kiosk; and in response to the user-generated request, transferring, via short-range wireless communication from the kiosk to the wireless device, local identity information to the wireless device, the local identity information for use by the wireless device, said local identity information providing the wireless device local operation on a foreign operator network.

According to another aspect of the present subject matter, there is provided a method form reciting a method for preparing a wireless device for local operation with a foreign operator network, the method comprising: storing a plurality of different identities in computer memory, each identity comprising information suitable for temporary use by the wireless device for operation with the operator network as a local subscriber; receiving a user-generated request for service made at a kiosk; selecting a currently unused identity; marking the selected identity as currently in-use; and transferring, via short-range wireless communication from the kiosk to the wireless device, the selected identity to the wireless device for use thereby.

According to another aspect of the present subject matter, there is provided an apparatus form reciting an apparatus for enabling a wireless device for local operation with a foreign operator network, the apparatus comprising: a physical user interface configured for receiving a user-generated request for service; and a short-range wireless interface module configured, in response to the user-generated request for service, to transfer local identity information from the apparatus to the wireless device via short-range wireless communication, the local identity information for use by the wireless device.

According to another aspect of the present subject matter there is provided another apparatus form reciting an apparatus for enabling a wireless device for local operation with a foreign operator network, the apparatus comprising: a server configured for operative coupling to the wireless device via a wireless network, the server configured to receive a user-generated request for service, the user-generated request entered via a user interface of the wireless device; and a wireless interface module configured, in response to the user-generated request for service, to transfer local identity information from the apparatus to the wireless device via the wireless network, the local identity information for use by the wireless device.

According to another aspect of the present subject matter, there is provided a computer program product form reciting a computer program product comprising a non-transitory computer readable medium having computer readable code embodied therein, for execution by a CPU, for performing operations for enabling a wireless device for operation with an operator network, the operations comprising: receiving a user-generated request for service made at a kiosk; and in response to the user-generated request for service, transferring, via wireless communication from the kiosk to the wireless device, local identity information to the wireless device, the local identity information for use by the wireless device.

DESCRIPTION OF THE DRAWINGS

The foregoing aspects and many of the attendant advantages of this subject matter will become more readily appreciated as the same become better understood by reference to the following detailed description, when taken in conjunction with the accompanying drawings, wherein.

DETAILED DESCRIPTION

Figure 1A:
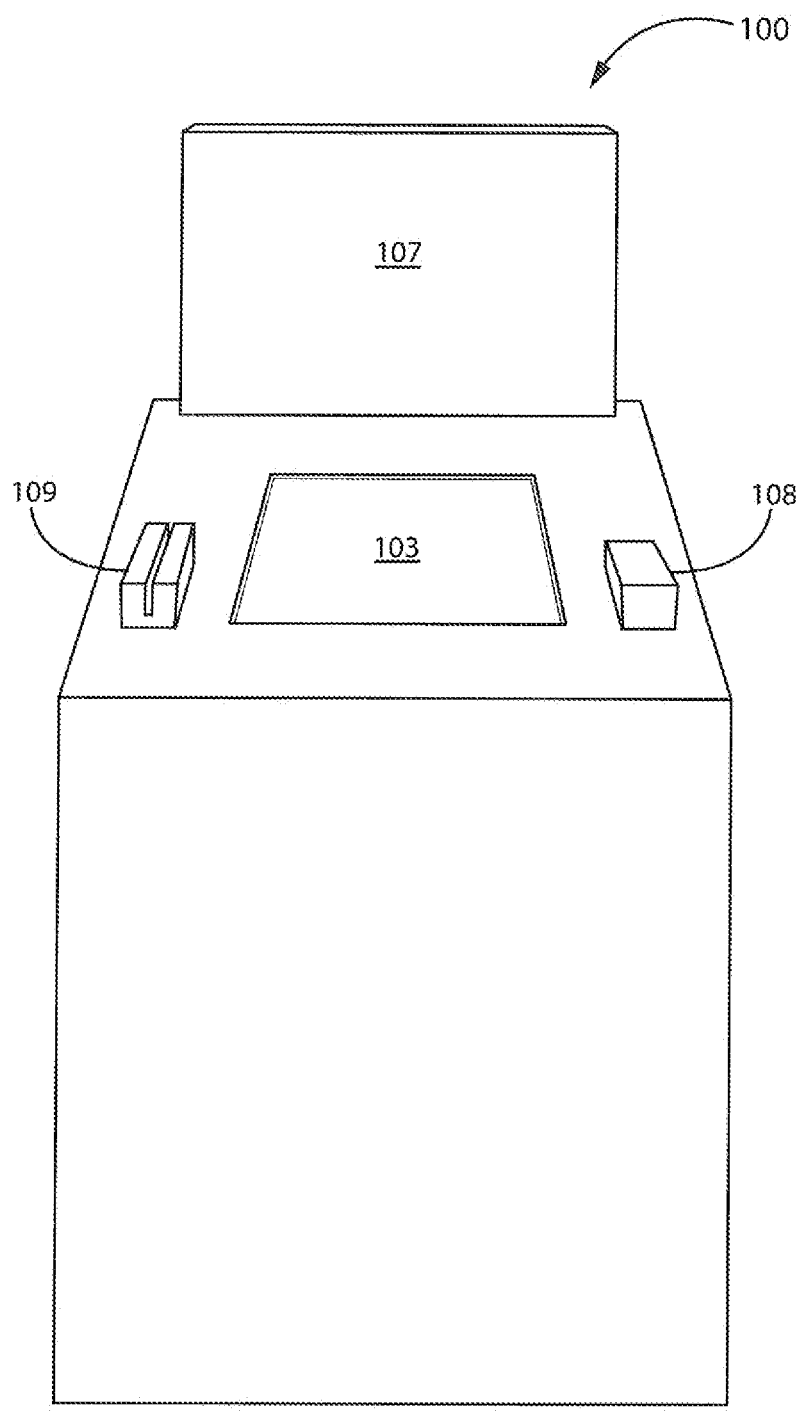
FIGS. 1A and 1B illustrate an apparatus for enabling a wireless device for local operation with a foreign operator network, in accordance with embodiments of the present subject matter.

The term "wireless device" is used to refer to an apparatus for analog and/or digital transmission and/or reception of signals for communication purposes via electromagnetic radiation propagating, for example, through vacuum, or air, or a generally non-conductive medium to or from another apparatus. The wireless device may use signals formatted according to one or more of a number of communication systems including mobile phone networks such as cellular networks, or other current or future wireless communication systems, for example. A wireless device can comprise or be included in one or more of various forms of handheld or mobile devices, such as a radio, mobile phone, cellular phone, satellite phone, media player, smart phone, or a personal computer (PC) such as a desktop, notebook, tablet PC, personal digital assistant (PDA), game console, or peripherals such as a printer, camera, pointing device, or other apparatus, for example.

In accordance with embodiments of the present subject matter, a wireless device is configured to hold identity information, for example on a removable or non-removable smart card, such as a UICC. Identity information may be associated with an application such as a SIM, CSIM, USIM, or the like. Identity information may comprise one or more identifiers such as telephone number, IMSI, IMEI, ESN, MEID, MSISDN, password, PIN, username, user information, network affiliations, country or regional affiliations, and the like.

The term "base station" is used to refer to a wireless device operating as an access point for coupling other wireless devices, such as mobile phones, to other parts of a communication network. The base station comprises a radio transceiver for communication with the other wireless devices in accordance with one or more wireless communication protocols, for example cellular communication protocols such as CDMA, CDMA2000, UMTS, GSM, LTE, or other wireless protocols, such as WLAN protocols. The base station further comprises an interface to a wired or wireless backhaul or other infrastructure for coupling with the other parts of the communication network, such as a mobile network operator's core network, the Internet, or a combination thereof, or the like. A base station may be, for example, a wireless access point, a macrocell, microcell, picocell or femtocell base station, a base transceiver station (BTS), a NodeB, an evolved NodeB, or the like.

The term "operator network" is used to refer to a communication network comprising one or more base stations and operated by one or more entities, such as a business entity, wireless service provider, government or public entity, alliance of private citizens, businesses or corporations, or the like. As used herein, the term "foreign operator network" refers to an operator network with respect to which a wireless device under discussion is not currently a local or direct subscriber. Such a wireless device may also be reciprocally referred to as foreign to the operator network. As an example, a device which does not belong to an operator's subscription service may be deemed as foreign to that operator's network or networks.

The term "kiosk" is used to refer to a booth, public computer terminal, computer kiosk, vending machine, reprogramming tool associated with a location, or other establishment accessible by the public and comprising an automated user interface by which a user can initiate and optionally pay for services such as those described herein. The user interface may comprise a physical user interface, such as a touch screen, for example.

In some embodiments, a kiosk may be a physical kiosk. In other embodiments, a kiosk may be a virtual kiosk. A virtual kiosk may, for example, comprise a server configured for communication with wireless devices via a wireless network, such as a Wi-Fi™ network, cellular network, a public Wi-Fi™ network or other wireless network as would be readily understood by a worker skilled in the art. The physical user interface in this case comprises the user interface of a wireless device carried by a potential user of the technology.

The term "short-range wireless communication" is used to refer to point-to-point or single-hop wireless communication methods such as near-field communication (NFC), Bluetooth™, and the like.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this subject matter belongs.

In accordance with an aspect of the present subject matter, there is provided a method for enabling a wireless device for local operation with a foreign operator network. A wireless device, visiting a foreign operator network, may be enabled for local operation, for example, if it is recognized by the foreign operator network as equivalent to a local subscriber of the foreign operator network. Local operation is contrasted with prior art methods such as operation under a roaming agreement, in which a wireless device is not recognized as equivalent to a local subscriber. The method comprises monitoring for and receiving user-generated request for services made at a kiosk, thereby identifying the wireless device as foreign to the operator network. The method further comprises transferring, via wireless communication, local identity information, such as identity information of the kind stored on a UICC, recognized by the operator network as being associated with a local subscriber, to the wireless device. The transfer is typically done from a wireless transceiver of the kiosk to the wireless device by a suitable protocol, such as a NFC or Bluetooth™. The wireless communication may thus be short-range wireless communication when the mobile wireless device is proximate to the kiosk. The local identity information, representative of a local identity, is suitable for temporary, permanent or quasi-permanent use by the wireless device, to facilitate operation of the wireless device with the operator network as a local subscriber. In some embodiments, if the local identity information is later released by the wireless device, it is further suitable for temporary, permanent or quasi-permanent use by one or more other wireless devices after said temporary use by the wireless device.

In accordance with another aspect of the present subject matter, there is provided an apparatus for enabling a wireless device for local operation with a foreign operator network. The apparatus may optionally be operatively coupled to the operator network, for example via a wired or wireless communication link. The apparatus comprises at least a physical user interface and a wireless interface module, such as a short-range wireless interface module. A short-range wireless interface module may be configured for wireless communication via NFC or Bluetooth™, for example. The physical user interface is configured to receive a user-generated request for service, thereby identifying the wireless device as foreign to the operator network. The wireless interface module is configured to transfer local identity information from the apparatus to the wireless device via wireless communication. The local identity information may be retrieved from a database containing currently available local identities, each being representative of respective local identity information.

In accordance with embodiments of the present subject matter, the wireless device is configured to temporarily adopt the identity information as its own so as to appear as equivalent to a local subscriber. For example, this may involve configuring and launching a SIM application or the like, which incorporates the local identity information.

Transferring of the local identity information to the wireless device is typically performed subsequently to interfacing with a user of the wireless device, for example to obtain authorization and payment or credit information. In some embodiments, the present subject matter is additionally directed toward obtaining payment information from a user of the wireless device, said payment information for use in recovering payment related to use of the local identity information by the wireless device in accordance with a predetermined service agreement; and initiating a request for payment based at least in part on said payment information. For example, the present subject matter may be configured to communicate with the user via the kiosk to: offer use of local identity information for a fee; receive a message accepting or declining the offer; request, receive and authenticate payment information upon acceptance; and communicate the required local identity information to the wireless device upon receipt and authentication of the payment information.

In some embodiments, the present subject matter is further directed toward storing a plurality of different identities in computer memory, and accessing the computer memory to acquire the local identity information corresponding to a selected identity stored therein. The selected identity corresponds to a local identity which is marked as currently unused. Once it has been selected and possibly provided to the wireless device for use, the selected identity is marked as currently in-use. The computer memory may be organized as a database or other data structure, for example, and marking a selected identity may comprise marking a first field in the database or data structure, the first field being linked to a second field containing the appropriate identity. In a further embodiment, the present subject matter may be additionally directed toward: monitoring for completion of temporary use of the local identity information; and upon completion of temporary use of the local identity information by the wireless device, marking the selected identity as currently unused. Monitoring for completion may be performed by monitoring for a return user visit to the original kiosk or an associated kiosk to release the local identity information, by monitoring for a remote message (SMS message, email, or the like) from the user indicative that the local identity information is being released, by monitoring the local network to detect a lapse in use of the local identity information, or the like. In some embodiments, the local identity information is only marked as unused upon an explicit release action performed by the user. Therefore, an identity may be "checked out" of the database when it is being used, and subsequently "checked in" again once it is no longer required. In some embodiments, local identity information associated with the respective local identity may be kept indefinitely for use upon future visits. Identities may therefore be supplied serially to different wireless devices, typically with the restriction that a single identity is only used by one wireless device at a time, although this restriction may be relaxed if feasible.

In some embodiments, authorized usage of the local identity information may be configured to expire after a predetermined usage limit is reached. For example, a user may prepay for use of the local identity information for a predetermined number of days, amount of data, number of text messages or voice minutes, or a combination thereof, or the like.

After the predetermined usage limit is reached, the mobile network may be configured to deny further services to the wireless device when using the local identity information, unless usage is extended by further payment. The local identity information may then be returned to a pool for re-use. The local identity information will be marked as expired until it is reissued from the pool. For added security, the mobile network may be configured to read a permanent identifier of the wireless device as well as the local identity information, to ensure that the wireless device currently attempting to use the local identity information is currently the one wireless device authorized to do so.

FIG. 1A illustrates an apparatus 100 for enabling a wireless device for local operation with an operator network, in accordance with embodiments of the present subject matter. The apparatus is in the form of a kiosk, and comprises a physical user interface 105, which is illustrated as a touch screen, but may optionally incorporate other interface means, such as a keyboard, mouse, trackball, buttons, audio input/output, and the like. The apparatus may comprise a sign 107 or other media identifying the services being offered. The apparatus may further comprise a rest 108 upon which a user can place their wireless device. The rest may be provided for convenience. Optionally, the rest 108 may incorporate a short-range wireless interface, such as an NFC transceiver, to facilitate transfer of local identity information to the wireless device. The apparatus further comprises a processor, memory, and other internal functional components (not shown), as described elsewhere herein. The apparatus further comprises a card reader 109, which may be a magnetic reader, chip reader, NFC interface, or the like, and which is configured for reading cards containing identity information and/or payment information, such as credit cards. It is appreciated that the apparatus may additionally or alternatively comprise other means for obtaining identity information and/or payment information, either by automatically reading an artifact of the user or by manual entry, or a combination thereof.

Alternatively, the apparatus may interface with users via the users' own wireless device. For example, the apparatus 100 may be configured to communicate via Wi-Fi™ with the wireless device. The apparatus 100 may comprise a Wi-Fi™ transceiver for this purpose or may use the services of another hotspot or wireless access point. The apparatus 100 may comprise a web server and may interface with the users' wireless device via a web browser operating on the wireless device, for example. Some or all of the functional aspects of the apparatus may thus be virtualized.

For example, the apparatus may comprise a server operatively coupled to a network such as a public Wi-Fi™ network servicing an airport or other location. When a user connects to the network, they may be given the option to engage services provided by the apparatus. The user may then interact with the server via a web browser or other suitable application on their wireless device, thereby interacting with the kiosk. This configuration allows users to engage the kiosk as a virtual kiosk without the need to find a physical kiosk. In some embodiments, a physical kiosk may comprise wireless communication capabilities, thereby functioning as both a physical and virtual kiosk. Although a Wi-Fi™ network has relatively longer range than NFC or Bluetooth™ wireless links, it may be considered relatively short range when compared with cellular networks, metropolitan area networks, and the like.

Figure 1B:
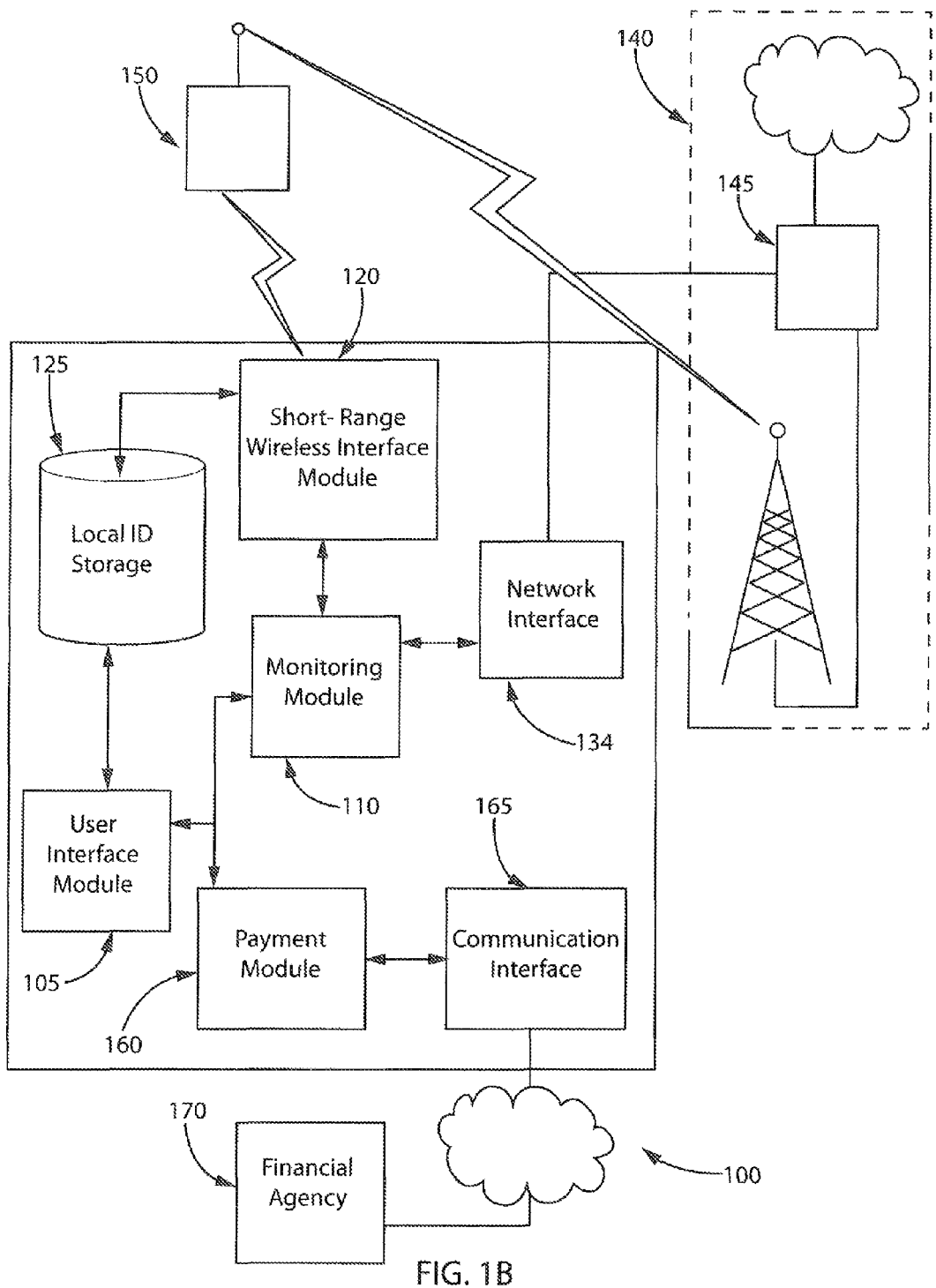

FIG. 1B illustrates a schematic view of the apparatus 100, in accordance with some embodiments of the present subject matter. The apparatus 100 comprises at least a user interface 105 and a short-range wireless interface module 120. The user interface provides a means by which a user may register and request the transfer of local identity information to their wireless device 150. The user may input their identity information and optionally payment information such as a credit card number (for example by swiping their credit card in the card reader 109). In various embodiments, the user interface module 105 may be configured to manage initial and ongoing interactions with the user carrying the wireless device, for example to offer services and receive acceptance of offers, to obtain and acknowledge receipt of payment information, to obtain and acknowledge notifications of termination of services, and the like.

The short-range wireless interface module 120 is configured to communicate wirelessly with the wireless device 150, via an available means such as Bluetooth™ or NFC. In some embodiments, user identity information, wireless device identity information and/or payment information may be retrieved automatically from the wireless device via the short-range wireless interface module 120, rather than being provided by the user. After initial interaction between the apparatus 100 and the user, the short-range wireless interface module 120 communicates with the wireless device 150 to transfer local identity information thereto. The local identity information may be transferred in an appropriate format and to an appropriate degree such that the wireless device 150 is able to use the local identity information as its own identity, at least for purposes of interfacing with the foreign operator network, for example to run a SIM or other application on a smart card or smart card emulator, or the like. The short-range wireless interface module 120 typically obtains the local identity information from computer memory 125, which may contain a pool of identities, for example in a database. As illustrated, the computer memory 125 may be provided within the apparatus 100. Alternatively, the identities may be stored remotely and retrieved as required. The computer memory 125 may serve as a cache memory for local identities, and this memory may be updated periodically on the direction of a remote server.

The apparatus 100 may be operatively coupled, via a network interface 134, to an operator network 140, to which a foreign wireless device 150 may connect. The local identity information is provided for use with the operator network 140. The apparatus 100 may comprise an optional monitoring module 110 which may be operatively coupled to the operator network 140 via the network interface 134. The monitoring module is configured to monitor the operator network for signs that local identity information, representative of the local identity and previously provided to the wireless device, is no longer in use by that wireless device. In that case, the local identity is marked as currently unused in the computer memory 125. Although the monitoring module 110 is illustrated within the apparatus 100, it or a portion thereof may be provided via a remote server. In some embodiments, this may comprise involvement of the network operator to grant the apparatus 100 access to information held by the operator network 140. For example, the monitoring module 110 may be configured to monitor data held in a register or server 145 of the operator network 140. The monitoring module 110 may determine that a particular local identity is no longer in use, for example, if the local identity information thereof has not been used for a predetermined number of days, weeks or months.

In some embodiments, the apparatus 100 may further comprise a payment module 160. The payment module 160 may be configured to obtain payment information via the user interface module 105 and/or card reader 109. Additionally or alternatively, the payment module 160 may be configured to communicate with the wireless device, via the short-range wireless interface module 120 and/or network interface 134 and wireless network 140, to obtain payment information. Payment information is generally for use in recovering payment related to use of the local identity information by the wireless device 150. The payment module 160 is further configured to initiate a request for payment based at least in part on said payment information, for example by contacting a financial agency such as a credit card, bank, escrow service, or the like, identified in the payment information. In some embodiments, the service may be pre-paid.

In some embodiments, the apparatus 100 may be a computer or computer server, comprising a processor operatively coupled to computer memory. The computer memory contains instructions for operation of the apparatus, including the user interface module 105, the short-range wireless interface module 120, and optionally the monitoring module 110 and/or the payment module 160. The computer memory may also contain the pool of identities and instructions for execution by the processor for managing same. The apparatus 100 may further comprise a network interface 134 for operatively coupling to one or more devices in the operator network 140, thereby facilitating communicative coupling therewith. The network interface 134 may be, for example an Ethernet™ interface, IP interface, ATM interface, SS7 interface, or other optical, wired or wireless interface comprising one or more standard or proprietary protocols for interfacing with the operator network 140, as would be readily understood by a worker skilled in the art. The payment module 160 may include a communication interface 165 for contacting a financial agency 170 for requesting payment associated with use of the local identity information. The communication interface 165 may be an interface for communicating with the Internet, for example. In some embodiments, the network interface 134 and communication interface 165 may be unified into a single interface, for example comprising a communication interface operatively coupled to the Internet and the operator network 140.

Figure 1C:
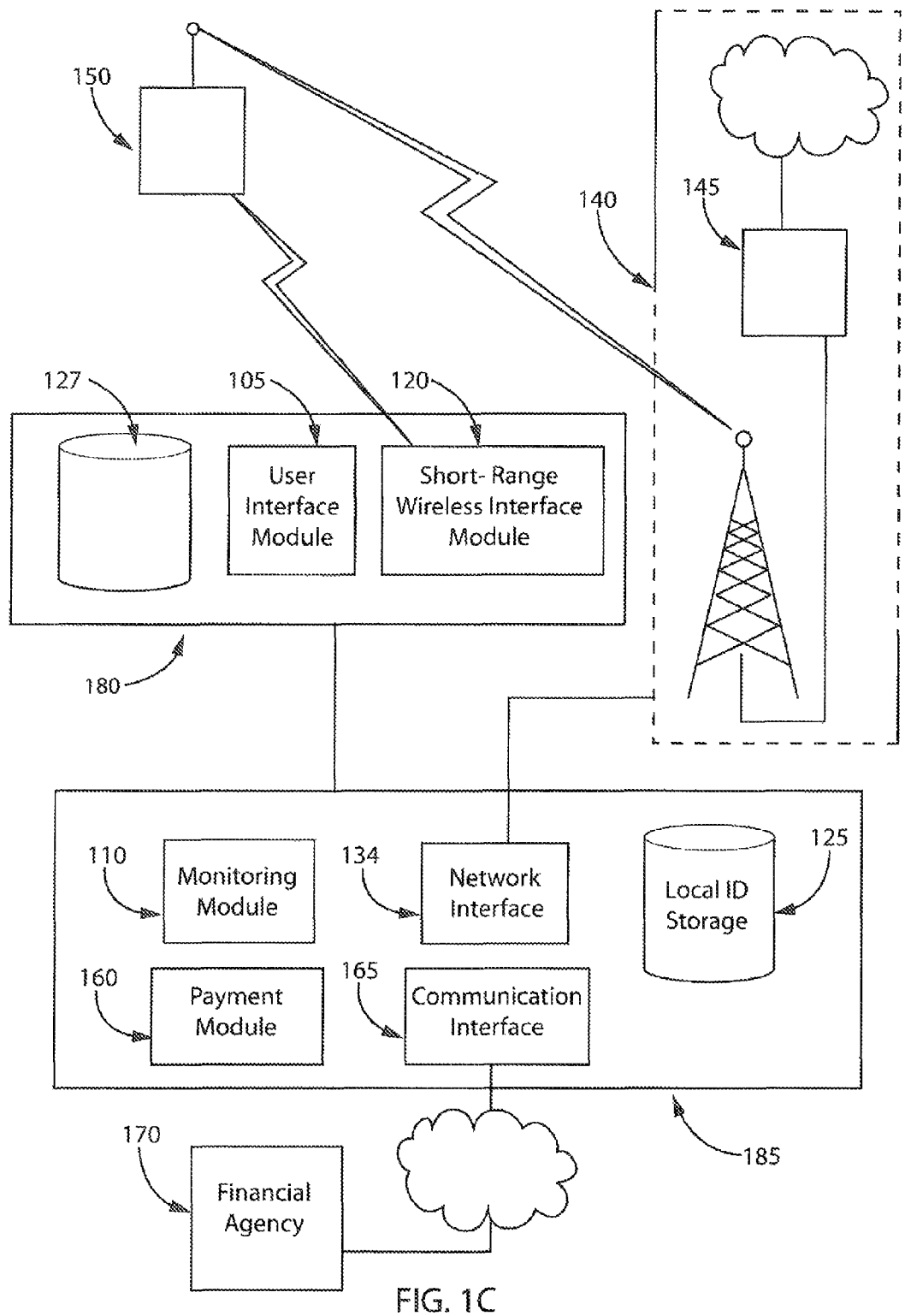
FIG. 1C illustrates an apparatus for enabling a wireless device for local operation with a foreign operator network, in accordance with other embodiments of the present subject matter.

An alternative apparatus is illustrated in FIG. 1C. The apparatus comprises a terminal 180 and a server 185. The terminal 180 may be a kiosk-style terminal such as illustrated in FIG. 1A, comprising at least the user interface module 105 and the short-range wireless interface module 120 as described above. The server 185 comprises the monitoring module 110, local identity storage 125, network interface 134, payment module 160, and financial agency communication interface 165, again as described above. The terminal 180 may further comprise a local identity cache 127 that temporarily stores at least one local identity retrieved from the local identity storage 125 of the server 185. Each local identity has associated therewith respective local identity information. The terminal 180 and the server 185 are operatively coupled via a secure communication link, as would be readily understood by a worker skilled in the art. The apparatus illustrated in FIG. 1C operates similarly to the apparatus 100, except that some functionalities are centralized at a remote server 185. The server may be operatively coupled to plural terminals at plural locations, so that the service may be offered at different locations.

Embodiments of the present subject matter may comprise functional equivalents of the apparatus 100 as illustrated in FIG. 1B or 1C. For example, embodiments may comprise plural computer devices each comprising one or more of a payment module, a monitoring module, and an interface module, along with appropriate interfaces and data storage. The plural computer devices may be configured to communicate with each other and cooperate so as to provide operation of an apparatus in accordance with the present subject matter.

Figure 2:
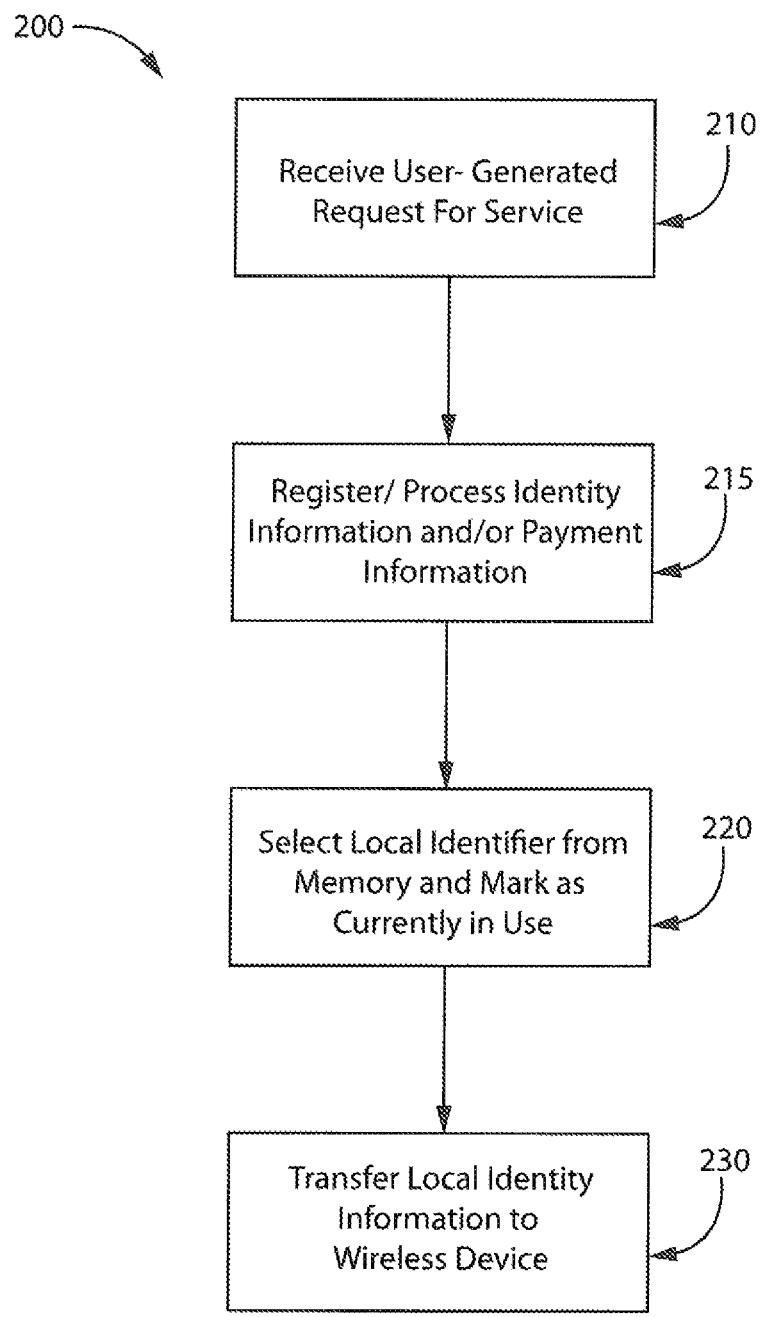
FIG. 2 illustrates a method for enabling a wireless device for local operation with a foreign operator network, in accordance with embodiments of the present subject matter.

FIG. 2 illustrates a general method 200 for enabling a wireless device for local operation with an operator network in accordance with embodiments of the present subject matter. The method 200 comprises receiving 210 a user-generated request for an offered service of providing a local identity, represented by respective local identity information, for use by the user's wireless device. The user-generated request may be made via a physical user interface at a kiosk, for example. The method further comprises, in response to the user-generated request for service, transferring 230, via short-range wireless communication from the kiosk to the wireless device, local identity information to the wireless device, the local identity information for temporary, permanent or quasi-permanent use by the wireless device. The method may further comprise, for example prior to the transfer 230, registering and/or processing 215 user identity information, wireless device identity information and/or payment information, and selecting 220 a local identity from local or remote memory for providing to the wireless device, and marking the selected identity as currently in use.

Figure 3:
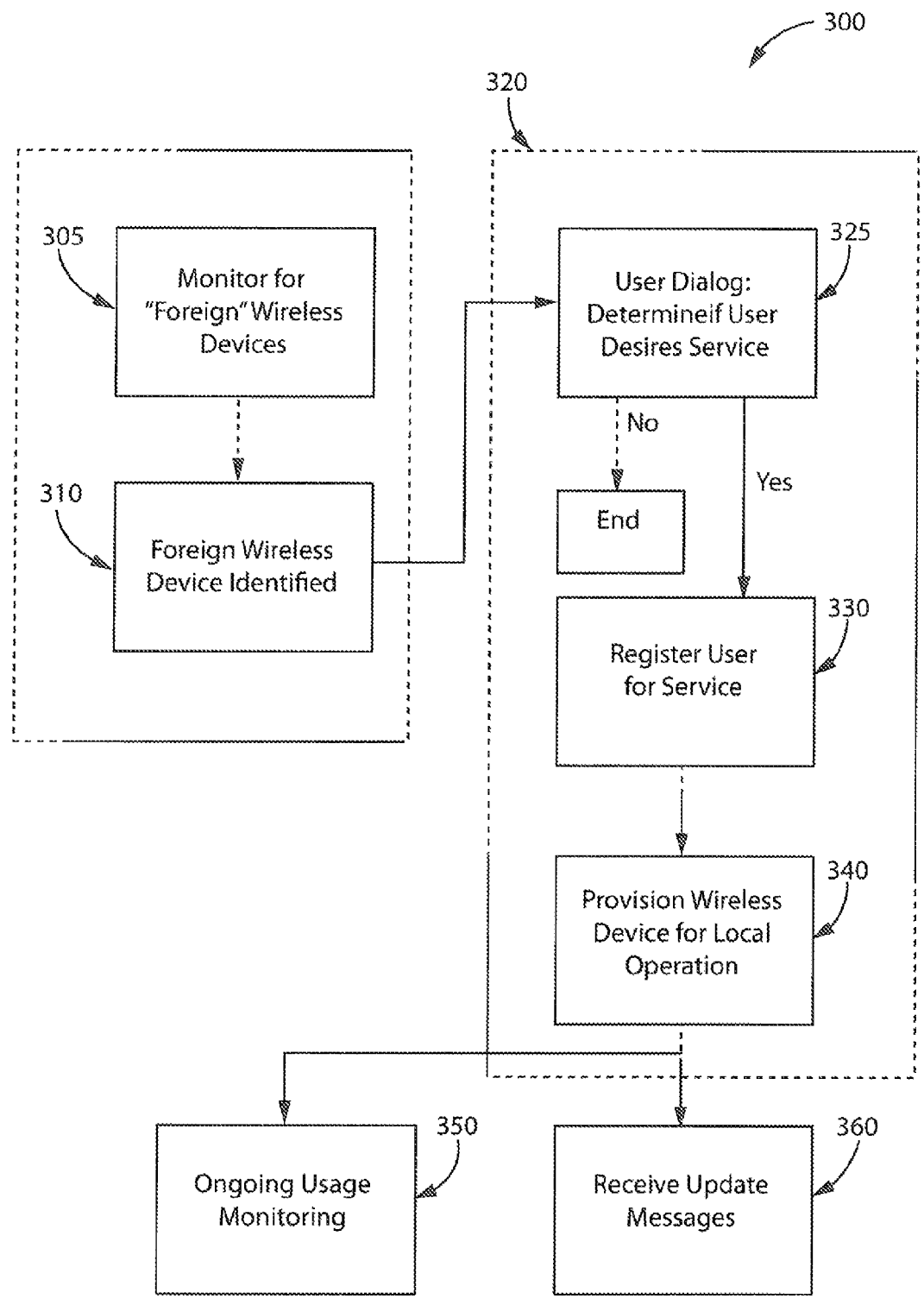
FIG. 3 illustrates another method for enabling a wireless device for local operation with a foreign operator network, in accordance with embodiments of the present subject matter.

FIG. 3 illustrates a method 300 for enabling wireless devices for local operation with an operator network in accordance with embodiments of the present subject matter. The method 300 comprises monitoring 305 connections of wireless devices to the operator network to determine if and when foreign wireless devices connect to the operator network. Monitoring may comprise monitoring for user-initiated transactions at a kiosk or one of a network of kiosks. Once a wireless device is identified 310 as foreign to the operator network, interfacing 320 with the identified foreign wireless device occurs. Interfacing 320 comprises an initial user dialog 325 for determining if a user of the wireless device desires the service, a registration operation 330 for obtaining user identification and/or payment information, and a provisioning operation 340 which, upon successful completion of the registration operation 330, comprises transferring the local identity to the wireless device. The local identity information may be transferred in an appropriate format and to an appropriate degree such that the wireless device is able to use the local identity information as its own identity, at least for purposes of interfacing with the foreign operator network. The method may further optionally comprise monitoring 350 usage of the local identity by the wireless device and/or receipt of update messages 360 indicative of termination or adjustment of provided services, or the like. Usage monitoring 350 may comprise monitoring data obtained by the wireless network indicative of activity of the wireless device and/or receiving update messages from the operator network, which may be initiated either by the wireless device or by the operator network. Usage monitoring may be used to derive payment information and/or to determine when the local identity information is no longer required by a wireless device, thereby allowing it to be released for use by another wireless device.

In some embodiments, a monitored database or registry which includes information regarding wireless devices foreign to the operator network may be a visitor location register (VLR), or the like. As would be readily understood by a worker skilled in the art, a VLR facilitates roaming agreements by tracking foreign wireless devices currently visiting an operator network. Another registry or database which may include information regarding wireless devices foreign to the operator network may be one associated with a RADIUS server.

In an example scenario in accordance with embodiments of the present subject matter, a wireless device initially connects to the foreign operator network upon arrival or power-on. This connection may be facilitated by existing roaming methods, which utilize identity information already stored in the wireless device. The user is subsequently presented with an offer to connect to the foreign network using local identity information downloaded from a pool of local identities. The offer may be presented via a kiosk, for example. The pool of local identities, which in some embodiments may be referred to as virtual UICC identities, may be provided by the foreign operator network. Usage of a local identity, represented by respective local identity information, may be monitored and billed to the wireless device or user thereof using a payment method such as PayPal or Visa. A variety of different payment offers for different amounts of data and periods of time could be offered for the user to select from. A billing event may be triggered automatically, for example periodically, upon predetermined billing amounts being reached, upon completion of temporary use of the local identity, or the like, or a combination thereof.

In some embodiments, a foreign device may be a wireless device primarily serviced by another service provider covering the same geographical area, territory or country as the foreign operator network. This may provide wireless device users with an option to purchase service at a competitive rate.

In some embodiments, the user may have an option to initiate providing of services by visiting a kiosk, telephoning an operator or representative of a service provider offering said services, sending an email, text or SMS message or by accessing a website. The user may thus initiate the step of identifying the wireless device as being foreign to the operator network through such an action, and identifying wireless devices as foreign to the operator network may comprise monitoring for user-generated requests for service. Such actions may be performed by the wireless device, for example by using the network of another service provider or using a roaming data service.

In some embodiments, temporary, permanent or quasi-permanent use of local identities is administered by an operator or service provider to which those identities are registered and local. Administration may be performed by the operator or service provider independently, by a separate business, or in co-operation with the one or more other service providers that could have negotiated a group rate. In some embodiments, a separate business may be able to offer services in co-operation with a plurality of service providers. For example, a business may allow wireless device users to sign up for a global roaming package, or one that bundles predetermined services for selected countries or regions and/or service providers of interest. This approach enables such a business to offer the convenience of a single invoice to a user for all roaming service.

In some embodiments, to enhance security, the provided identity information, representative of a specified local identity, may be protected from duplication or tampering. For example, a token system may be implemented to allow an identity to be used only by one wireless device at a given time. For example, before an identity is lent out for temporary, permanent or quasi-permanent use by a wireless device, the wireless device or user thereof may be required to provide an authenticated token indicative of its permanent identity. In some embodiments, the token may be strongly associated with the wireless device's home identity information. That is, the wireless device may be required to communicate its home identity information in order to receive the local identity information.

In some embodiments, plural identities are stored in a database and transferred, as needed, to wireless devices for use thereby. Prior to transferring, the method, apparatus and computer program product according to embodiments of the present subject matter may be configured to obtain information indicative of a permanent identity of the wireless device or user thereof, and/or payment information for use in recovering payment related to use of the identity information by the wireless device in accordance with a predetermined service agreement. For example, after an initial user dialog in which the user agrees to subscribe to a service offering the identity, the wireless device may transmit, based on the user's input and/or authorization, permanent identity information and/or payment information. Permanent identity information may include a permanent telephone number, IMSI, IMEI, ESN, MEID, MSISDN, user name, user address, or the like. Payment information may include a credit card number, Paypal™ account number, bank account number, escrow service account number, proof of prepayment, acceptable promise to pay, or the like.

In some embodiments, a kiosk may display a welcome message to wireless device users upon their entry to a new roaming service area containing a foreign operator network. To facilitate this, the kiosks may be appropriately placed at airports, train stations, border crossings, or the like. The welcome message may be interactive and may include an option to either continue to connect to the foreign operator network in a conventional manner, for example roaming, or to connect using local identity information representative of a respective local identity, thereby operating as equivalent to a local device relative to the foreign network. In some embodiments, release of the local identity may be automatic upon departure from the foreign operator's area of coverage, triggered, for example, by a predetermined timeout, removal of the wireless device from an operator registry, or the like. In some embodiments, release of the local identity may be user initiated, for example by sending a message (voice message, email, text message, or the like) to a predetermined automated recipient, or by visiting a kiosk and selecting an option to release that specific local identity.

In embodiments of the present subject matter, the wireless device, upon obtaining and installing the local identity information, indicative of a respective local identity, becomes equivalent to a device holding a valid local subscription to services of the operator network. Billing is therefore managed by the operator network and/or a business entity to which the local identity is registered.

A potential advantage of embodiments of the present subject matter is that it may be used to reduce or eliminate the practice of backhauling the user's data to the user's home country in order for billing to be managed by their home service providers.

Another potential advantage of embodiments of the present subject matter is that it may be used to reduce or eliminate the need to carry multiple UICCs or other smart cards when traveling, and to physically change cards. This is particularly problematic when UICC or other identity electronics are built into a wireless device, or when a wireless device is locked to a particular UICC.

In some embodiments, the present subject matter may be used to enable a wireless device to operate as equivalent to a local subscriber for use of voice services, data services, or both. When the wireless device operates as a local-subscriber-equivalent in terms of voice services, it may receive a local telephone number. In some embodiments, a wireless device may be configured to use its permanent identity information for voice services and its local identity information for data services, or vice-versa. A wireless device may thus be configured to run multiple concurrent SIM applications, or the like. In some embodiments, a wireless device may be configured to operate concurrently as both a roaming device and a local-equivalent device, by virtue of multiple concurrent operating SIM or like applications. In this case, the wireless device may be configured with prioritization rules to determine which identity to use for outgoing voice calls and/or outgoing data transmissions.

Local identity information may be used temporarily, permanently, or quasi-permanently by the wireless device to operate as equivalent to a local subscriber. For example, the local identity information may be used for providing or modifying an application, such as a SIM, USIM, CSIM application or the like, running on the wireless device or smart card, such as a UICC, thereof. The local identity information may comprise executable code, for example corresponding to an executable SIM, USIM or CSIM application or a portion thereof, source code or other information for use in creating and/or compiling appropriate executable code, data fields usable to modify an existing application or executable code thereof, or the like, or a combination thereof. In some embodiments, local identity information may comprise an applet file or the like wirelessly communicated to the wireless device and implemented thereon, as described for example in "ETSI TS 102 240 v6.0.0, Technical Specification: Smart Cards; UICC Application Programming Interface and Loader Requirements; Service Description; (Release 6)," European Telecommunications Standards Institute, 2002.

For example, in some embodiments, the local identity information comprises code of a SIM application, which may be downloaded, installed and executed by a UICC of the wireless device. The SIM application may contain local identity information such as a serial number, IMSI, authentication and ciphering information, passwords, list of authorized services, network information, and the like. This information is configured to be recognized by the operator network as belonging to a local subscriber thereof. All or a portion of the information may be pre-registered with the operator network to this end.

Local identity information for use by a wireless device to configure, compile, and/or execute an identity application such as a SIM application may be transferred and implemented in various ways. In some embodiments, the identity application may be stored and/or executed on a smart card, off a smart card, or a combination thereof. In some embodiments, the identity application may be executed on a smart card emulator running on the wireless device. Various methods of programming, providing and executing secure or unsecure smart card applications may be used as would be readily understood by a worker skilled in the art.

In some embodiments, a wireless device may be configured to concurrently hold its own previous identity information as well as the local identity information obtained in accordance with the present subject matter. For example, the wireless device may operate plural applications such as SIM applications concurrently on a UICC thereof, one for its own "permanent" identity and one for its newly assumed, possibly temporary, local identity. In some embodiments, this may enable the wireless device to at least receive calls and data addressed to either the permanent or new local identity, while preferably using the new identity to send data.

In some embodiments, the present subject matter may be used in conjunction with Mobile IP or other data forwarding methods, to allow the wireless device to retain at least a portion of its connectivity of its "permanent" identity while taking advantage of efficiency and economy of its new local identity.

In some embodiments, multiple identities, including one or more local identities, each represented by specified local identity information, may be stored in wireless device memory, for example within a UICC card. Rather than lose the normal home identity when taking on a new one, the new local identity for use while visiting a different country or location may be added to a range of available identities for the user to select at will. Available identities may be selected via a pre-existing functionality of the wireless device, for example. In some embodiments, the user may be able to set rules for selection of the various identities based on criteria such as location, time of day and service provider, or the like, or a combination thereof. Embodiments of the present subject matter may provide for an application for applying pre-defined and/or user-defined rule sets for identity selection.

In some embodiments, identities conferred upon a wireless device by way of the present subject matter may be optionally released, deleted, or kept indefinitely. The charge for keeping an identity indefinitely may be nominally higher, however not prohibitively high. A dormant identity (held by the wireless device but not used for a long period of time), may incur no additional charges, or a nominal additional charge.

In some embodiments, a permanent, that is unchanging and unchangeable identity, is stored in the array of available identities. The permanent identity may serve, for example together with the ICCID of the wireless device, as a means to uniquely identify the device and possibly to control or curtail usage in case the device is stolen. This may help prevent undesired use of the present technology by persons wishing to continue using stolen wireless devices with a new local identity.

Figure 4:
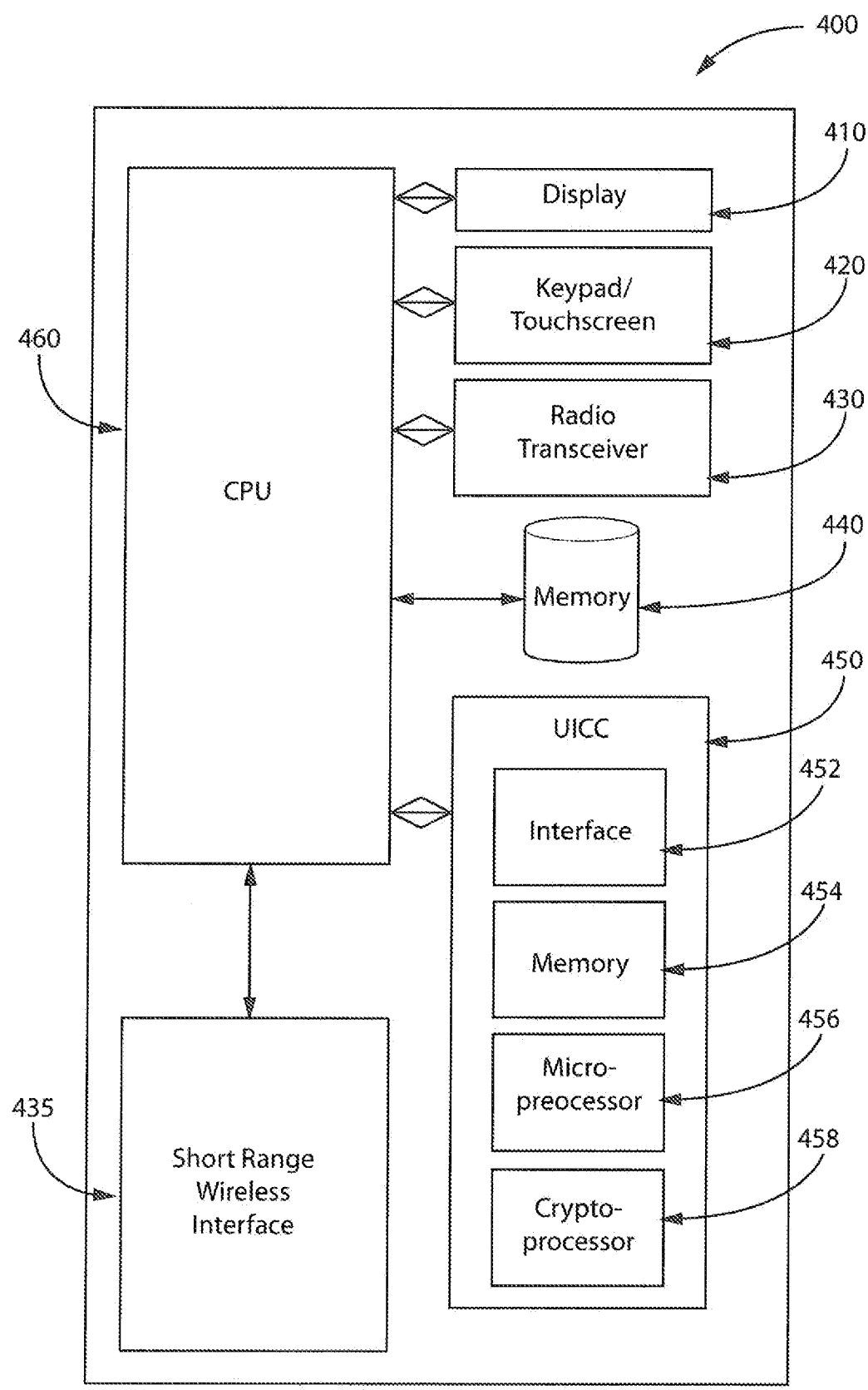
FIG. 4 illustrates a wireless device and UICC in accordance with embodiments of the present subject matter.

FIG. 4 illustrates a wireless device 400 operatively coupled to a UICC 450 in accordance with embodiments of the present subject matter. The wireless device 400 comprises a display 410, such as an LCD screen, a user input device 420 such as a keypad and/or touch screen, and a radio transceiver 430 configured to communicate wirelessly with one or more operator networks in accordance with one or more predetermined protocols. The wireless device 400 further comprises a CPU 460 such as a microprocessor or microcontroller and associated electronics, and memory 440, such as RAM, ROM, Flash, optical, solid-state, magnetic, or other memory. The CPU 460 is operatively coupled to the display 410, user input 420, transceiver 430, memory 440 and UICC 450, for example via one or more data busses, for communicating therewith to send and/or receive instructions or data. The UICC 450 comprises a data interface 452 for operatively coupling with the wireless device 400 and/or CPU 460, internal memory 454 such as solid-state memory, an on-board microprocessor 456, and a crypto-processor 458. The wireless device further comprises at least one short-range wireless interface 435, such as a Bluetooth™ transceiver, NFC communication module, Wi-Fi™ transceiver, or the like.

Local identity information, representative of a local identity, provided to the wireless device 400 via the short-range wireless communication module 435 may be stored in memory 440 of the wireless device 400 and/or memory 454 of the UICC 450. The CPU 460 of the wireless device may execute instructions for configuring and storing the local identity information, as may the microprocessor 456 and/or crypto-processor 458. In some embodiments, the local identity information is used to configure a program or application which is stored in memory and executed by one or more of the CPU 460, the microprocessor 456 and the crypto-processor 458. The program or application may be a SIM, USIM, CSIM, or other application, for example. The program may be stored and executed at least in part by the UICC 450. The program may alternatively be stored and executed by the wireless device 400. In some embodiments, a supervisory program which coordinates the operation of plural SIM, USIM, and/or CSIM applications, or the like, may also be stored on and executed by the wireless device 400 and/or UICC 450.

Figure 5:
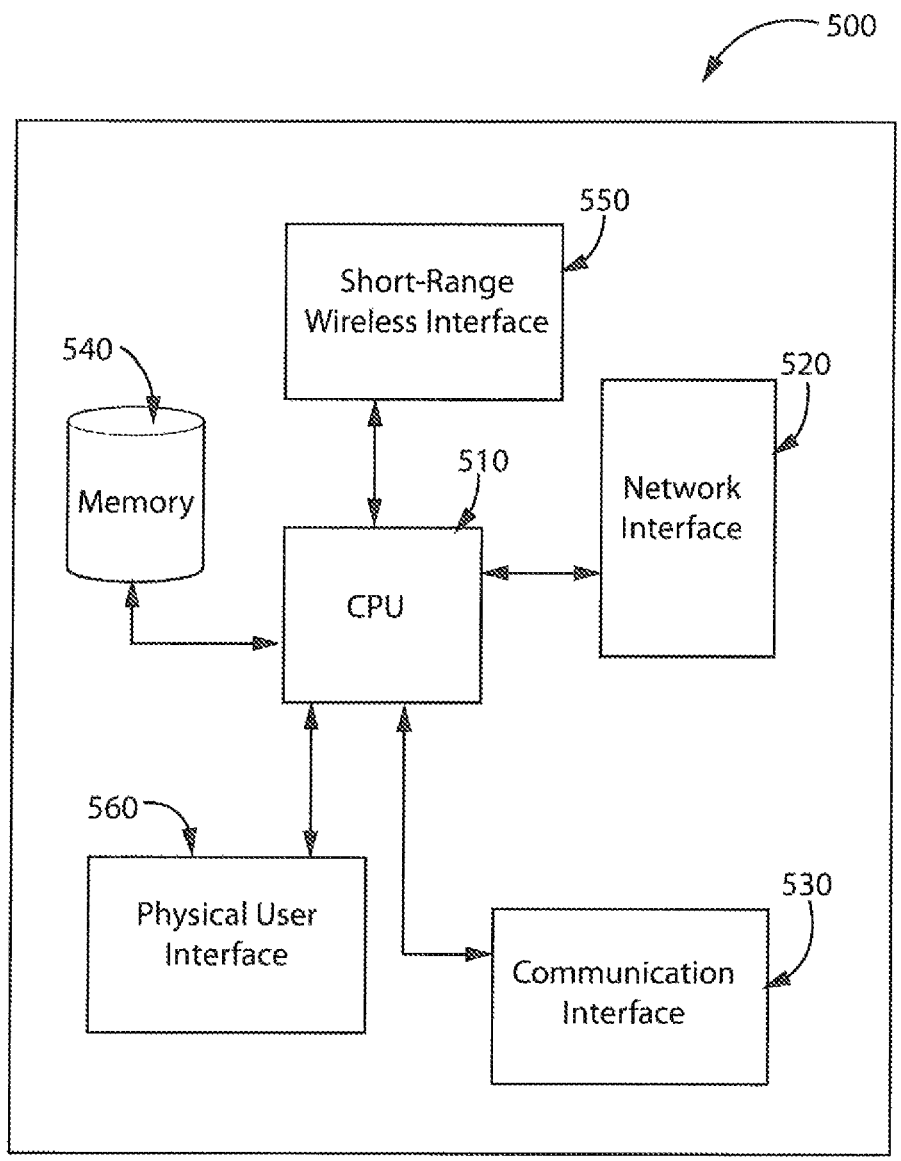
FIG. 5 illustrates an apparatus for enabling a wireless device for local operation with a foreign operator network, in accordance with embodiments of the present subject matter.

FIG. 5 illustrates an apparatus 500 for enabling a wireless device for local operation with a foreign operator network, in accordance with embodiments of the present subject matter. The apparatus 500 comprises a CPU 510, operatively coupled to a network interface 520, a communication interface 530, and memory 540. The CPU 510 is configured to execute program instructions stored in memory 540 to perform operations in accordance with the present subject matter. The CPU 510 may also be configured to access the memory 540 or another memory to read identity information stored therein, and communicate these via the network interface 520. The CPU 510 may further be configured to manage communication via communication interface 530, for example to conduct financial transactions. The CPU 510 may execute instructions to communicate with the operator network, via the network interface 520, for example to monitor the operator network so as to identify foreign wireless devices, communicate therewith, and monitor activity thereof. The apparatus 500 further comprises a short-range wireless interface 550 for facilitating identity information transfer to the wireless device. The apparatus 500 further comprises a physical user interface 560, such as a touch screen, to facilitate direct user interaction.

It will be appreciated that, although specific embodiments of the subject matter have been described herein for purposes of illustration, various modifications may be made without departing from the spirit and scope of the subject matter. In particular, it is within the scope of the subject matter to provide a computer program product or program element, or a program storage or memory device such as a solid or fluid transmission medium, magnetic or optical wire, tape or disc, or the like, for storing signals readable by a machine, for controlling the operation of a computer and/or firmware according to the method of the subject matter and/or to structure its components in accordance with the system of the subject matter.

In addition, while portions of the above discuss the subject matter as it can be implemented using a generic OS and/or generic hardware, it is within the scope of the present subject matter that the method, apparatus and computer program product of the subject matter can equally be implemented to operate using a non-generic OS and/or can use non-generic hardware.

Further, each step of the method may be executed on any general computer, such as a personal computer, server or the like, or system of computers, and pursuant to one or more, or a part of one or more, program elements, modules or objects generated from any programming language, such as C++, C#, Java, PL/1, or the like. In addition, each step, or a file or object or the like implementing each said step, may be executed by special purpose hardware or a circuit module designed for that purpose.

The foregoing embodiments of the subject matter are examples and can be varied in many ways. Such present or future variations are not to be regarded as a departure from the spirit and scope of the subject matter, and all such modifications would be appreciated by one skilled in the art and are intended to be included within the scope of the following claims.

The embodiments of the invention in which an exclusive property or privilege is claimed are defined as follows:

1. A method for enabling wireless device for local operation with a foreign operator network, the method implemented using one or more computing devices and comprising:
 (a) receiving a user-generated request requesting local operation of the wireless device at a kiosk; and
 (b) in response to the user-generated request, transferring, via short-range wireless communication from the kiosk to the wireless device, local identity information to the wireless device, the local identity information for use by the wireless device, said local identity information providing the wireless device local operation on a foreign operator network,
 wherein the local identity information corresponds to an identity recognized by the foreign operator network as being associated with a local subscriber.

2. A method for enabling a wireless device for local operation with a foreign operator network, the method implemented using one or more computing devices and comprising:
 (a) receiving a user-generated request requesting local operation of the wireless device at a kiosk; and
 (b) in response to the user-generated request, transferring, via short-range wireless communication from the kiosk to the wireless device, local identity information to the wireless device, the local identity information for use by the wireless device, said local identity information providing the wireless device local operation on a foreign operator network,
 (c) storing a plurality of different local identities in computer memory, each local identity represented by respective local identity information;
 (d) accessing the computer memory to acquire the local identity information corresponding to a selected local identity stored therein, the selected local identity marked as currently unused; and
 (e) marking the selected local identity as currently in-use.

3. The method according to claim 2, the method further comprising:
 (a) monitoring for completion of temporary use of the local identity; and
 (b) upon completion of temporary use of the local identity by the wireless device, marking the selected local identity information as currently unused, the local identity thereby suitable for use by one or more other wireless devices after temporary use by the wireless device.

4. A method for enabling a wireless device for local operation with a foreign operator network, the method implemented using one or more computing devices and comprising:
 (a) receiving a user-generated request requesting local operation of the wireless device at a kiosk; and
 (b) in response to the user-generated request, transferring, via short-range wireless communication from the kiosk to the wireless device, local identity information to the wireless device, the local identity information for use by the wireless device, said local identity information providing the wireless device local operation on a foreign operator network,
 (c) obtaining payment information from a user of the wireless device, said payment information for use in recovering payment related to temporary use of the local identity information by the wireless device in accordance with a predetermined service agreement; and
 (d) initiating a request requesting payment based at least in part on said payment information.

5. A method for enabling a wireless device for local operation with a foreign operator network, the method implemented using one or more computing devices and comprising:
 (a) receiving a user-generated request requesting local operation of the wireless device at a kiosk; and
 (b) in response to the user-generated request, transferring, via short-range wireless communication from the kiosk to the wireless device, local identity information to the wireless device, the local identity information for use by the wireless device, said local identity information providing the wireless device local operation on a foreign operator network, further comprising storing the local identity to the wireless device as part of a set of selectable identities, wherein an identity of the set of selectable identities is selectable via user action, operation of a predetermined rule set, or a combination thereof.

6. The method according to claim 5, wherein the set of selectable identities comprises a static identity, the static identity providing wireless device identification, wireless device access control, or both.

7. The method according to claim 5, wherein the kiosk is a physical kiosk.

8. The method according to claim 5, wherein the kiosk is a virtual kiosk.

9. A method for preparing a wireless device for local operation with a foreign operator network, the method comprising:
(a) storing a plurality of different identities in computer memory, each identity comprising information suitable for temporary use by the wireless device including operation with the operator network as a local subscriber;
(b) receiving a user-generated request requesting service made at a kiosk;
(c) selecting a currently unused identity;
(d) marking the selected identity as currently in-use; and
(e) transferring, via short-range wireless communication from the kiosk to the wireless device, the selected identity to the wireless device for use thereby
(f) monitoring for completion of use of the selected identity; and
(g) upon completion of temporary use of the selected identity by the wireless device, marking the selected identity information instance as currently unused.

10. The apparatus according to claim 9, wherein the local identity information corresponds to an identity recognized by the operator network as being associated with a local subscriber.

11. An apparatus for enabling a wireless device for local operation with a foreign operator network, the apparatus comprising:
(a) a physical user interface configured to receive a user-generated request for service;
(b) a short-range wireless interface module configured, in response to the user-generated request for service, to transfer local identity information from the apparatus to the wireless device via short-range wireless communication, the local identity information for use by the wireless device; and
(c) computer memory having stored therein a plurality of different identities, the apparatus configured to:
access the computer memory to acquire the local identity information corresponding to a selected identity, the selected identity marked as currently unused; and
mark the selected identity as currently in-use.

12. The apparatus according to claim 11, the apparatus further configured to:
(a) monitor, via a monitoring module, for completion of temporary use of the local identity information by the wireless device; and
(b) upon completion of temporary use of the local identity information by the wireless device, mark the selected identity as currently unused, the local identity information thereby suitable for use by one or more other wireless devices after temporary use by the wireless device.

13. An apparatus for enabling a wireless device for local operation with a foreign operator network, the apparatus comprising:
(a) a physical user interface configured to receive a user-generated request for service;
(b) a short-range wireless interface module configured, in response to the user-generated request for service, to transfer local identity information from the apparatus to the wireless device via short-range wireless communication, the local identity information for use by the wireless device; and
(c) a payment module configured to:
obtain, from a user of the wireless device, payment information, said payment information for use in recovering payment related to use of the local identity information by the wireless device, in accordance with a predetermined service agreement; and
initiate a request requesting payment based at least in part on said payment information.

14. An apparatus for enabling a wireless device for local operation with a foreign operator network, the apparatus comprising:
(a) a server configured to be operatively coupled to the wireless device via a wireless network, the server configured to receive a user-generated request for service, the user-generated request entered via a user interface of the wireless device;
(b) a wireless interface module configured, in response to the user-generated request for service, to transfer local identity information from the apparatus to the wireless device via the wireless network, the local identity information for use by the wireless device; and
(c) computer memory having stored therein a plurality of different identities, the apparatus configured to:
access the computer memory to acquire the local identity information corresponding to a selected identity, the selected identity marked as currently unused; and
mark the selected identity as currently in-use.

15. The apparatus according to claim 14, wherein the local identity information corresponds to an identity recognized by the operator network as being associated with a local subscriber.

16. The apparatus according to claim 14, the apparatus further configured to:
(a) monitor, via a monitoring module, for completion of temporary use of the local identity information by the wireless device; and
(b) upon completion of temporary use of the local identity information by the wireless device, mark the selected identity as currently unused, the local identity information thereby suitable for use by one or more other wireless devices after temporary use by the wireless device.

17. A computer program product comprising a non-transitory computer readable medium having computer readable code embodied therein, for execution by a CPU, for performing operations enabling a wireless device operation with an operator network, the operations comprising:
(a) receiving a user-generated request requesting service made at a kiosk;
(b) in response to the user-generated request requesting service, transferring, via short-range wireless communication from the kiosk to the wireless device, local identity information to the wireless device, the local identity information for use by the wireless device;
(c) storing a plurality of different identities in computer memory;

(d) accessing the computer memory to acquire the local identity information corresponding to a selected identity stored therein, the selected identity marked as currently unused; and (e) marking the selected identity as currently in-use.

18. The computer program product according to claim 17, wherein the local identity information corresponds to an identity recognized by the operator network as being associated with a local subscriber.

19. The computer program product according to claim 17, the operations further comprising:

(a) monitoring for completion of temporary use of the local identity information; and (b) upon completion of temporary use of the local identity information by the wireless device, marking the selected identity as currently unused, the local identity information thereby suitable for use by one or more other wireless devices after temporary use by the wireless device.

20. A computer program product comprising a non-transitory computer readable medium having computer readable code embodied therein, for execution by a CPU, for performing operations enabling a wireless device operation with an operator network, the operations comprising:

(a) receiving a user-generated request for service made at a kiosk;

(b) in response to the user-generated request for service, transferring, via short-range wireless communication from the kiosk to the wireless device, local identity information to the wireless device, the local identity information for use by the wireless device;

(c) obtaining payment information from a user of the wireless device, said payment information for use in recovering payment related to use of the local identity information by the wireless device in accordance with a predetermined service agreement; and (d) initiating a request requesting payment based at least in part on said payment information.

* * * * *